US010343776B2

(12) United States Patent
Mishra et al.

(10) Patent No.: US 10,343,776 B2
(45) Date of Patent: *Jul. 9, 2019

(54) DIRECTED FRAGMENTATION FOR UNMANNED AIRBORNE VEHICLES

(71) Applicant: Amazon Technologies, Inc., Seattle, WA (US)

(72) Inventors: Pragyana K. Mishra, Seattle, WA (US); Dushyant Goyal, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/793,386

(22) Filed: Oct. 25, 2017

(65) Prior Publication Data

US 2018/0057167 A1    Mar. 1, 2018

Related U.S. Application Data

(63) Continuation of application No. 15/179,773, filed on Jun. 10, 2016, now Pat. No. 9,828,097.

(51) Int. Cl.
*G06Q 10/08*   (2012.01)
*B64D 1/12*   (2006.01)
(Continued)

(52) U.S. Cl.
CPC .............. *B64D 1/12* (2013.01); *B64C 39/024* (2013.01); *B64D 47/08* (2013.01); *G05D 1/105* (2013.01);
(Continued)

(58) Field of Classification Search
CPC .......... B64D 1/12; B64D 47/08; G05D 1/105; G08G 5/0021; G08G 5/0091;
(Continued)

(56) References Cited

U.S. PATENT DOCUMENTS

| | | | |
|---|---|---|---|
| 2010/0094789 A1* | 4/2010 | Tranchero | F41G 7/007 706/21 |
| 2015/0217874 A1* | 8/2015 | Mesguen | B64D 43/00 701/29.1 |

(Continued)

OTHER PUBLICATIONS

U.S. Appl. No. 15/179,773 filed Jun. 10, 2016, Notice of Allowance dated Aug. 24, 2017.

*Primary Examiner* — Jaime Figueroa
(74) *Attorney, Agent, or Firm* — Thomas | Horstemeyer, LLP; Michael J. D'Aurelio; Jason M. Perilla (57) ABSTRACT

Directed fragmentation of an unmanned aerial vehicle (UAV) is described. In one embodiment, the UAV includes various components, such one or more motors, batteries, sensors, a housing, casing or shell, and a payload for delivery. Additionally, the UAV includes a controller. The controller determines a flight path and controls a flight operation of the UAV. During the flight operation, the controller develops a release timing and a release location for one or more of the components based on the flight path, the flight conditions, and terrain topology information, among other factors. The controller can also detect a disruption in the flight operation of the UAV and, in response, direct fragmentation of one or more of the components apart from the UAV. In that way, a controlled, directed fragmentation of the UAV can be accomplished upon any disruption to the flight operation of the UAV.

20 Claims, 7 Drawing Sheets

(51) Int. Cl.

| | | |
|---|---|---|
| *G05D 1/10* | (2006.01) | |
| *H04B 7/185* | (2006.01) | |
| *B64C 39/02* | (2006.01) | |
| *B64D 47/08* | (2006.01) | |
| *G08G 5/00* | (2006.01) | |

(52) U.S. Cl.
CPC ....... *G06Q 10/0832* (2013.01); *G08G 5/0021* (2013.01); *G08G 5/0034* (2013.01); *G08G 5/0069* (2013.01); *G08G 5/0086* (2013.01); *G08G 5/0091* (2013.01); *H04B 7/18506* (2013.01); *B64C 2201/128* (2013.01); *B64C 2201/141* (2013.01)

(58) Field of Classification Search
CPC .. G08G 5/0086; G08G 5/0034; G08G 5/0069; G06Q 10/0832; B64C 39/024; B64C 2201/141; B64C 2201/128; H04B 7/18506
USPC .......................................................... 701/1, 7
See application file for complete search history.

(56) References Cited

U.S. PATENT DOCUMENTS

| | | | |
|---|---|---|---|
| 2016/0196757 A1 | 7/2016 | Knoblach | |
| 2016/0214716 A1 | 7/2016 | Knoblach et al. | |
| 2016/0257415 A1* | 9/2016 | Ye | B64D 3/00 |
| 2017/0001724 A1* | 1/2017 | Yates | B64C 39/024 |
| 2017/0122713 A1 | 5/2017 | Greenwood | |

* cited by examiner

DIRECTED FRAGMENTATION FOR UNMANNED AIRBORNE VEHICLES

CROSS-REFERENCE TO RELATED APPLICATIONS

This application is a continuation of U.S. patent application Ser. No. 15/179,733, titled "Directed Fragmentation for Unmanned Airborne Vehicles," filed Jun. 10, 2016, the entire disclosure of which is hereby fully incorporated herein by reference.

BACKGROUND

After an order for one or more items is placed through an electronic commerce marketplace, the items in the order are picked, the order is packaged into one or more shipping or packing containers, and the shipping or packing containers are provided to a carrier for delivery. The purchaser may choose a class of delivery service based upon considerations such as delivery costs, delivery speed, etc. Thus, the delivery of items typically includes picking and packaging items, providing the packaged items to a carrier for delivery, and delivering the items. Even for small items or small numbers of items, boxes or other packages are typically transported by vehicles over roads, sometimes across long distances.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

When being delivered, packages are often transported by vehicles over roads, sometimes across long distances. New modes of transportation, however, may include delivery by unmanned aerial vehicles (UAVs). The use of UAVs is accompanied by the need for new solutions to various problems, such as service disruptions due to unsuitable weather conditions, equipment malfunctions, and other problems.

In that context, various embodiments related to the fragmentation of UAVs are described. In one case, a UAV includes various parts or components, such one or more motors, batteries, sensors, a housing, casing or shell, and a shipping container or other payload for delivery. Additionally, the UAV includes a flight controller and a fragmentation controller. The flight controller determines a flight path and controls a flight operation of the UAV for delivery of the payload.

While the UAV is in-flight, the fragmentation controller develops and updates a fragmentation sequence. Among other information, the fragmentation sequence includes a release timing and a release location to fragment away (e.g., release, drop, jettison, eject, etc. away) one or more UAV components in case the flight operation of the UAV is disrupted. The fragmentation sequence can be evaluated and updated over time based on the flight path of the UAV, the ongoing flight conditions for the UAV, and the terrain topology over which the UAV is flying, among other factors. Terrain topology information or data can identify certain preferred locations for dropping one or more of the components of the UAV. For example, the terrain topology information can identify bodies of water, forested areas, open fields, and other locations more suitable for dropping components of the UAV if or when flight operation errors, malfunctions, or unexpected conditions occur.

The fragmentation controller can also detect disruptions in the flight operation of the UAV and, in response, direct fragmentation of one or more components of the UAV apart from the UAV based on the fragmentation sequence. In that way, a controlled, directed fragmentation of various parts of the UAV can be accomplished upon disruption of the flight operations of the UAV or at other desired times. This can result in the UAV, and certain parts of the UAV, landing at more preferable or suitable locations if flight operations are disrupted.

Figure 1:
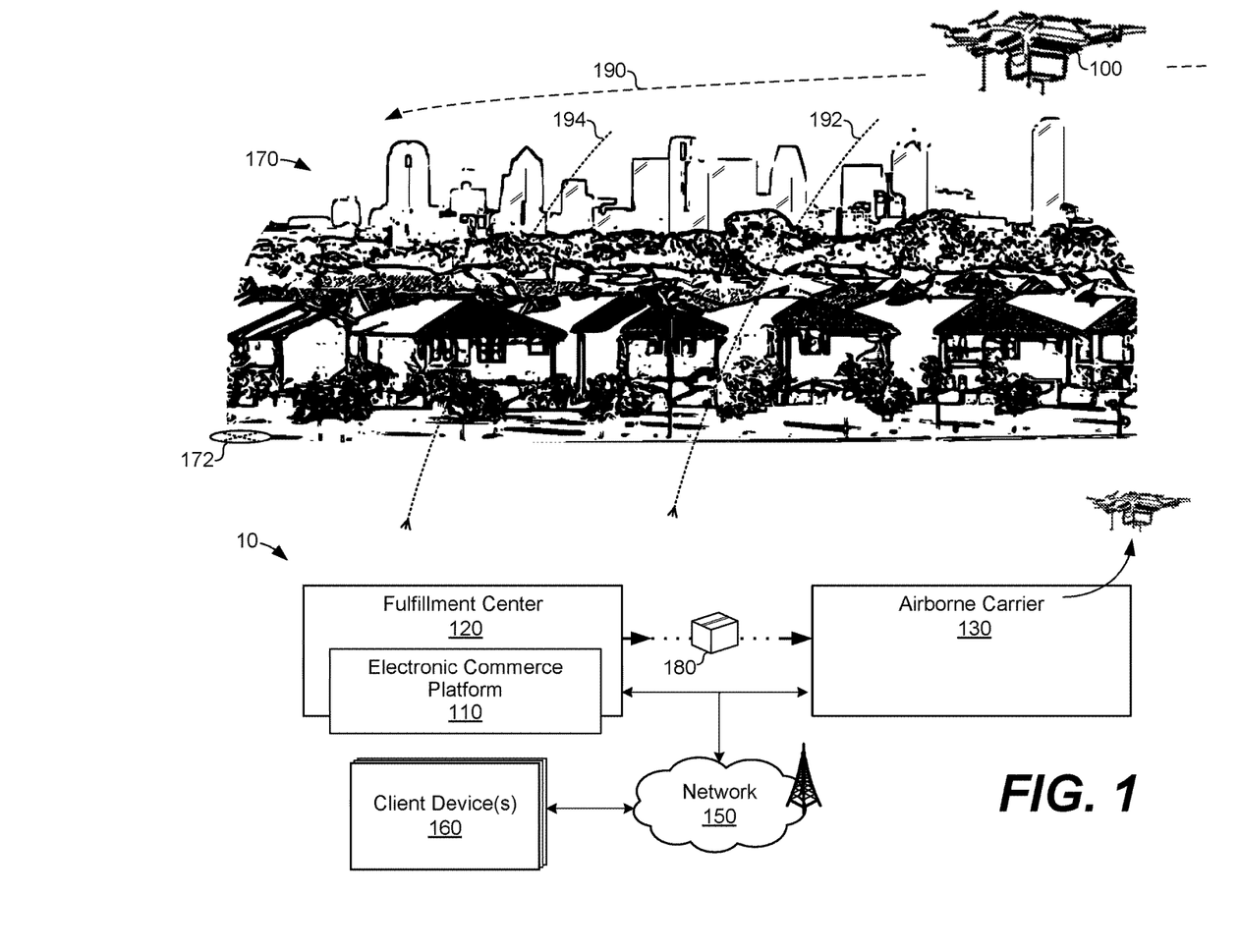
FIG. 1 illustrates an example system for delivery using an unmanned aerial vehicle (UAV) according to one embodiment of the present disclosure.

Turning to FIG. 1 for additional context, FIG. 1 illustrates an example system 10 for delivery using a UAV 100 according to one embodiment of the present disclosure. The system 10 includes an electronic commerce platform 110, a fulfillment center 120, an airborne carrier 130, a network 150, and one or more client devices 160. The system 100 provides a UAV-based air delivery service to the geographic region 170.

The electronic commerce platform 110 can be embodied as one or more computing devices arranged, for example, in one or more server or computer banks. The electronic commerce platform 110 operates an electronic marketplace for selling items, goods, and/or services. In that context, the electronic commerce platform 110 can facilitate online purchases over the network 150. The electronic commerce platform 110 can also perform various back end functions associated with the online presence of a merchant to facilitate the online purchases. For example, the electronic commerce platform 110 can generate network pages, such as web pages or other types of network content, that are provided to the client devices 160 for selecting items for purchase.

The network 150 can include the Internet, intranets, extranets, wide area networks (WANs), local area networks (LANs), wired networks, wireless networks, cellular networks, cable networks, satellite networks, other suitable networks, or any combination thereof. The UAV 100, the electronic commerce platform 110, the airborne carrier 130, and the client devices 160 can communicate with each other using any suitable application layer, transport layer, and internet layer protocols and systems interconnect frameworks.

The client devices 160 are representative of one or a plurality of client devices of one or more users. The client devices 160 may be embodied as any computing device or system, including but not limited to those embodied in the form of a desktop computer, a laptop computer, a cellular telephone, or a tablet computer, among other example computing devices and systems.

In operation, an order can be placed through the network 150 to the electronic commerce platform 110 using one of the client devices 160. The order is submitted from the electronic commerce platform 110 to the fulfillment center 120 for fulfillment (e.g., picking, packing, etc.). At the fulfillment center 120, one or more items from the order can be prepared and packaged into a shipping container 180, for example, or other package. In turn, the fulfillment center 120 provides the shipping container 180 to the airborne carrier 130 as a payload for delivery, along with a destination address for the delivery. In the example shown in FIG. 1, the delivery zone 172 is representative of the destination address for the delivery.

The airborne carrier 130 secures the shipping container 180 to a UAV, such as the UAV 100, for delivery. After the shipping container 180 is secured to the UAV 100, the UAV 100 can be used to autonomously (or semi-autonomously) provide airborne delivery of the shipping container 180 and/or other payloads, items, packages, parcels, etc. to the delivery zone 172. As described in further detail below, the UAV 100 is configured to determine its flight path and control its flight operation along the flight path 190 to the delivery zone 172.

There are some circumstances, however, when the UAV 100 may encounter unexpected difficulties during the delivery of the shipping container 180. For example, the UAV 100 can encounter unexpected heat, cold, wind, rain, hail, high or low (e.g., barometric) pressure regions, or other meteorological conditions. These conditions can impact the flight operations of the UAV 100 in various ways. For example, high winds may make it difficult or impossible to control the flight operations of the UAV 100, for the UAV 100 to arrive at the delivery zone 172, or for the UAV 100 to return to the airborne carrier 130. High heat may also result in failure or malfunction of the battery of the UAV 100, leading to loss of thrust provided by the rotor system. Similarly, other components of the UAV 100, such as the rotor system, flight control computer, flight sensors, or other components, can unexpectedly malfunction or fail for various reasons.

Regardless of the circumstances surrounding the disruption in flight operation, the embodiments described herein are directed to a controlled sequence for fragmenting away components of a UAV. The embodiments can be particularly helpful in case of a catastrophic failure of the UAV's flight operation, such as one in which the UAV enters into a free fall while travelling at a certain height and speed. The embodiments can also be helpful in other cases where a disruption in flight operation is caused by partial loss of flight control. When loss of flight operation is detected, the UAV can enter a fragmentation sequence mode. During the fragmentation sequence, one or more parts or components of the UAV can be released. In doing so, the weight, speed, air drag coefficient, and other factors related to the UAV can be altered. At the same time, the momentum and trajectory of the UAV are also altered. According to aspects of the embodiments, the fragmentation sequence is tailored to modify or alter the manner in which the UAV descends, to control the descent in a preferred, controlled manner.

Referring again to FIG. 1, while the UAV 100 is in route to the delivery zone 172. A fragmentation controller of the UAV 100 is configured to evaluate the flight path 190 along the route to the delivery zone 172 and the ongoing flight conditions of the UAV 100. Based on the flight path, the ongoing flight conditions, and topography data associated with the region 170, the fragmentation controller is also configured to develop a fragmentation sequence. The fragmentation sequence can include release timings and release locations for one or more components of the UAV 100. The UAV 100 can also include release mechanisms to fragment away (e.g., release, drop, jettison, eject, etc. away) the components at the release timings and release locations.

For example, the fragmentation sequence can include a release timing and location to release a first component of the UAV along the trajectory 192. The fragmentation sequence can also include a second release timing and location to release a second component of the UAV along the trajectory 194. As described in further detail below, the fragmentation controller of the UAV 100 can determine and update the fragmentation sequence both before and after a disruption to the flight operation of the UAV 100. The fragmentation sequence can be tailored to select suitable locations for descent of various components of the UAV 100 to the ground, based on knowledge of the topography of the region 170. Additionally, the fragmentation sequence can be tailored to modify or alter the manner in which the remainder of the UAV 100 descends, to control its descent in a preferred, controlled manner. These and other aspects of the embodiments are described in further detail below.

Figure 2:
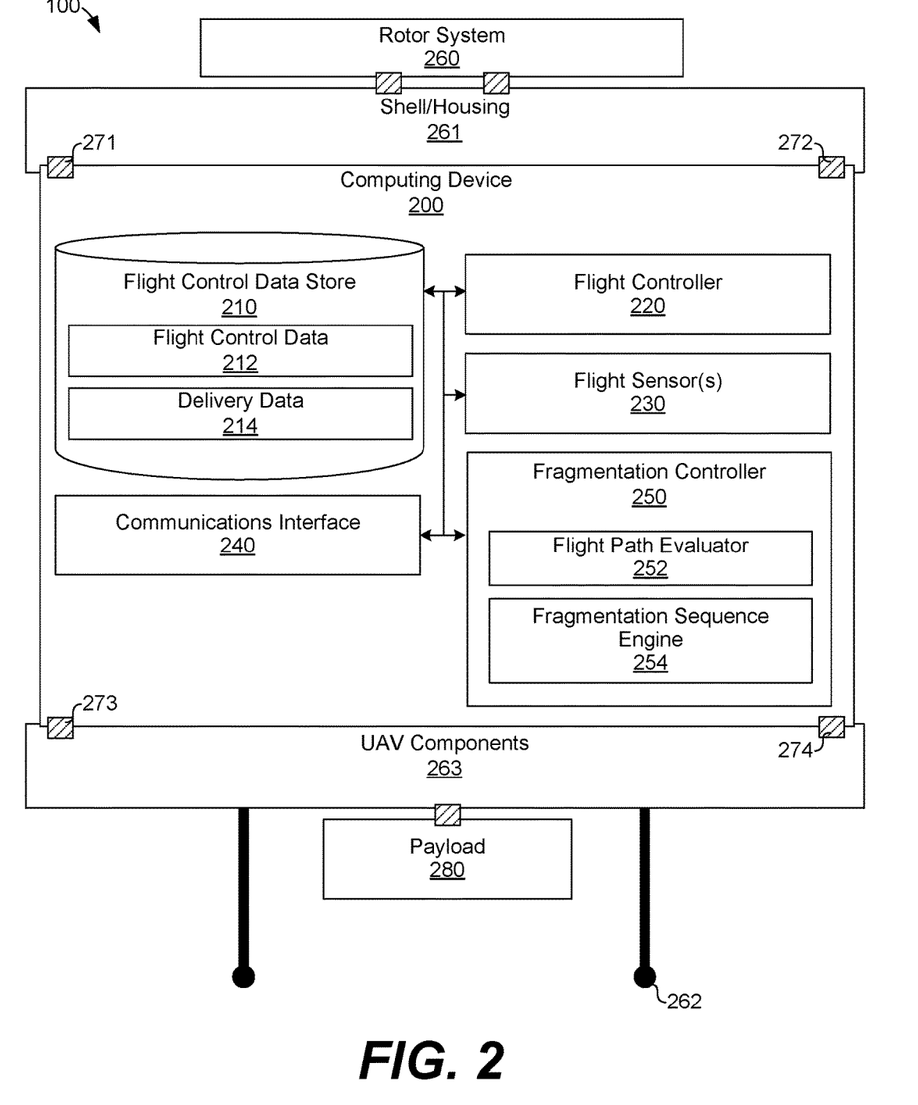
FIG. 2 illustrates a block diagram of various components of the UAV in FIG. 1 according to various embodiments of the present disclosure.

Turning to FIG. 2, a block diagram of various components of the UAV 100 in FIG. 1 is illustrated. The block diagram of the UAV 100 in FIG. 2 is representative, not drawn to scale, and not intended to be limiting with regard to the arrangement or types of components that can be part of the UAV 100. The block diagram of the UAV 100 in FIG. 2 is not exhaustive as to the components or parts of the UAV 100. The UAV 100 can include various components, such as one or more airfoils or wings, batteries, fuel tanks, landing gear, frame structures, etc., that are either omitted from view or drawn representatively for the sake of simplicity in illustration. Finally, not every component shown in FIG. 2 is required in all embodiments, and one or more components illustrated in FIG. 2 may be omitted.

As shown in FIG. 2, the UAV 100 includes the computing device 200. The computing device 200 includes the flight control data store 210, which stores the flight control data 272 and the delivery data 274. The computing device 200 also includes the flight controller 220, the flight sensors 230, the communications interface 240, and the fragmentation controller 250, which includes the flight path evaluator 252 and the fragmentation sequence engine 254. Among other components, the UAV 100 includes the rotor system 260, the shell or housing 261, the landing gear 262, and the UAV components 263. Release mechanisms, including the release mechanisms 271-274, among others not individually referenced in FIG. 2, are used in the UAV 100 to secure certain components of the UAV 100 together. As described in further detail below, the release mechanisms 271-274 (and others) can be used to release components away from the UAV 100. The UAV 100 also carries the payload 280, which may include one or more items, containers, packages, parcels, etc. The payload 280 can also be released away from the UAV 100 by a release mechanism.

In the flight control data store 210, the flight control data 212 can include any data necessary to control the flight of the UAV 100, such as operations and/or control algorithms, flight reference data (e.g., flight path, starting, ending, waypoint data, etc.), map data, weather data, etc. The delivery data 214 can include data related to the delivery of the payload 280, such as map or coordinate system data, address data, scheduling, and/or delivery protocol data, etc. The terrain topology data 216 can include land topography data as well as information about what artificial (e.g., man-made) features are expected over various geographic regions. For example, the terrain topology data 216 can identify the locations and boundaries of bodies of water, rivers, fields, forested areas, hills, mountains, and other topography data. Additionally, the terrain topology data 216 can identify the locations and boundaries of residential, commercial, and industrial buildings and developments, highways and surface streets, parking lots, stadiums, schools, recreational areas, and other artificial features. The terrain topology data 216 can also include certain rankings, metrics, or priority values for the natural and artificial features. For example, the terrain topology data 216 can associate a body of water or field with a higher ranking for disposition of a component of the UAV 100 than a residential area. The fragmentation controller 250 can reference the terrain topology data 216 stored in the flight control data store 210 when developing fragmentation sequences as described in further detail below.

The flight controller 220 can be embodied, at least in part, as one or more specific- or general-purpose processors, processing circuits, computers, processing devices, or computing devices having memory. The flight controller 220 can also be embodied, in part, as various functional and/or logic (e.g., computer-readable instructions, code, firmware, etc.) elements executed or operated to direct the operations and functions described herein.

Among other functions, the flight controller 220 is configured to determine the flight path and control the flight operation of the UAV 100. In that context, the flight controller 220 can reference data stored in the flight control data store 210, such as the flight reference and delivery address data, to determine an appropriate flight path of the UAV 100 in an autonomous (or semi-autonomous) manner. The flight controller 220 can also receive and process feedback information provided by the flight sensors 238, such as positioning coordinate data, image-capture information, environmental data, etc., to conduct flight operations and locate a delivery zone to drop the payload 280. The flight controller 220 is further configured to maintain and control the orientation of the UAV 100 during flight operations, and the flight sensors 238 can provide feedback to the flight control processor 232 regarding the orientation of the UAV 100 to assist with that control.

The flight sensors 230 can include various sensors, such as cameras, multi-dimensional camera arrays, infrared or thermal sensors, radar sensors, laser-based survey sensors (e.g., LIDAR), electro-optical/infrared sensor packages, micro- or nano-electromechanical system (NEMS or MEMS) or other accelerometers, gyroscopes, or orientation sensors, global positioning system (GPS) sensors, height, altitude, or altimeter sensors, ultrasonic sensors, atmospheric pressure sensors, etc.

The flight sensors 230 can provide data for navigation of the UAV 100 along its flight path and during the execution of directed fragmentation sequences. For example, data from one or more of the flight sensors 230 can be provided to the flight controller 220 for navigation of the UAV 100 to a delivery zone. Additionally, data captured by the flight sensors 230 can be provided to the fragmentation controller 250, and this data can be used to identify timings and/or locations for fragmentation of components apart and away from the UAV 100 as described herein. This data can also be used to determine various flight parameters of the UAV 100, such as the height, speed, pitch, yaw, or roll of the UAV 100, during flight operation and fragmentation processes.

The communications interface 240 can include any suitable interface for communicating data, such as a cellular interface (e.g., Global System for Mobile communications ("GSM"), Code Division Multiple Access ("CDMA"), Local Multi-point Distribution Systems ("LMDS"), Long Term Evolution ("LTE"), Multi-channel-Multi-point Distribution System ("MMDS"), etc.), a Bluetooth interface, a Wireless Local Area Network ("WLAN") (e.g., 802.11 or 802.16) interface, other similar interfaces, or any combination thereof.

The fragmentation controller 250 can be embodied, at least in part, as one or more specific- or general-purpose processors, processing circuits, computers, processing devices, or computing devices having memory. The fragmentation controller 250 can also be embodied, in part, as various functional and/or logic (e.g., computer-readable instructions, code, firmware, etc.) elements executed or operated to direct the operations and functions described herein. The fragmentation controller 250 can operate in conjunction with or independently from the flight controller 220 in various stages of operation. In one embodiment, the processing circuitry, memory, power source (e.g., battery, etc.), and other parts of the fragmentation controller 250 can be entirely separate from those of the flight controller 220. In that case, the fragmentation controller 250 can include a battery 256 separate from the battery 264. Using the battery 256, the fragmentation controller 250 can operate even during a failure of the battery 264 (and the flight controller 220). In other cases, however, the flight controller 220 and the fragmentation controller 250 can share certain hardware components, including batteries, memories, processors, etc.

Among other operations, the fragmentation controller 250 is configured to evaluate the flight path and flight conditions of the UAV 100 and develop a fragmentation sequence for components of the UAV 100 based on the flight path and the flight conditions. The flight path can include the path to a delivery zone, for example, and the flight conditions can include the current height, speed, weight, orientation, and other flight operation information of the UAV 100. The evaluation of the flight path and flight conditions of the UAV 100 can be ongoing over time, before, after, and during flight operations (and disruptions to flight operations) of the UAV 100.

The flight path evaluator 252 can examine the terrain topography data 216 stored in the flight control data store 210 along the flight path of the UAV 100. With reference to the terrain topography data 216, the flight path evaluator 252 can identify one or more preferred locations for various components of the UAV 100 to fragment apart and fall away from the UAV 100 in the case of a disruption to flight operations, for example. With reference to the current flight operations and conditions of the UAV 100, the fragmentation sequence engine 254 can determine a release timing and a release location for any number of the components of the UAV 100, with an aim to release those components, at the same or respective times, so that they descend in a calculated or estimated trajectory to the preferred locations. In the event that a disruption to the flight operation of the UAV 100 does occur, the fragmentation sequence engine 254 can execute the fragmentation sequence. As noted above, the fragmentation sequence can be determined by the fragmentation sequence engine 254 before or after any disruption to the flight operation of the UAV 100. Additional aspects of the fragmentation controller 250 are described below.

The release mechanisms 271-274 can be embodied as various mechanisms actuated by the fragmentation controller 250 to release components of the UAV 100 in the event of disruptions to flight operations of the UAV 100, as described herein, or at other desired times. As one example, one or more of the release mechanisms 271-274 can include attachment mechanisms, such as clips, latches, hooks, or other mechanical interferences releasable by energizing a solenoid or motor. In some cases, the attachment mechanisms can be spring-loaded to help push components away from the UAV 100. As another example, a permanent magnet, latch, hook, or other attachment feature can be released by a solenoid, electromagnet, or motor with or without the use of springs or other spring-based ejection mechanisms. In other cases, the release mechanisms 271-274 can include releasable doors, gates, interlocks, straps, ties, or other releasable securing, attaching, or fastening mechanisms.

If an electromagnet is relied upon as part of one of the release mechanisms 271-274, it can be powered or actuated to secure one or more components of the UAV 100. When power to the electromagnet is cut off, the electromagnet can be demagnetized and release the components. In another case, a permanent magnet can hold the components. When power is provided to the electromagnet, current that flows through the electromagnet can demagnetize, oppose, or overcome the magnetization of the permanent magnet and release the components. Additionally, other attachment mechanisms are within the scope of the embodiments, including various combinations of the mechanisms described above.

Other than or in addition to springs, small explosive charges, compressed gas charges, or similar mechanisms can be used as part of the release mechanisms 271-274 to aide in separating one or more components away from the UAV 100. The potential energy stored in any spring, explosive charge, compressed gas, or similar mechanism can be known and stored in the flight control data store 210. Thus, the potential energy and other characteristic information of the release mechanisms 271-274 can be referenced by the fragmentation controller 250 when developing fragmentation sequences.

As suggested in FIG. 2, the release mechanisms 271-274 can be interposed between or among various components of the UAV 100, such as the rotor system 260, the shell or housing 261, the landing gear 262, the UAV components 263, the payload 280, the frame of the UAV 100, and other structures. Similar release mechanisms can be interposed between and capable of releasing other components of the UAV 100, such as its frame, control circuitry, battery, etc.

The rotor system 260 can include one or more motors, engines, etc., with attached propellers that provide thrust for flight of the UAV 100. Among the embodiments, any suitable type and number of motors, engines, etc. can be relied upon to provide thrust for flight, depending upon considerations such as the size of the UAV 100, the weight of the shipping container 180, the distance the UAV 100 must travel for delivery of the shipping container 180, or other considerations. The rotor system 110 and, hence, the flight of the UAV 100 can be controlled by the flight controller 220 and/or the fragmentation controller 250 as described herein.

The shell or housing 261 can be embodied as a shell, casing, or housing for the UAV 100 and can be formed from plastic, metal, or other materials and combinations thereof. The UAV components 263 are representative of various parts that can be found on UAVs. Examples include, but are not limited to, one or more batteries 264, airfoils, cameras, antennas, fuel tanks, signal lights, winches, tethers, loading bays, etc. The airfoils can include wings, fins, tails, etc. The batteries 264 can include various sizes, types, and configurations of batteries to provide energy to the rotor system 260, the computing device 200, and other components in the UAV 100. Finally, the landing gear 262 is representative of any suitable landing gear for the UAV 100.

The UAV 100, with its components, has a certain mass and weight. At flight speeds, the UAV 100 carries an amount of momentum based on its mass and speed. The potential impact energy of the UAV 100 is determined by this momentum and, in part, by its height during flight operation. At the same time, each individual component of the UAV 100 is associated with its own weight, air drag coefficient, and other characteristics. The attributes of the components of the UAV 100 can be stored in the flight control data store 210 and referenced by the fragmentation controller 250 when determining fragmentation sequences.

Figure 3:
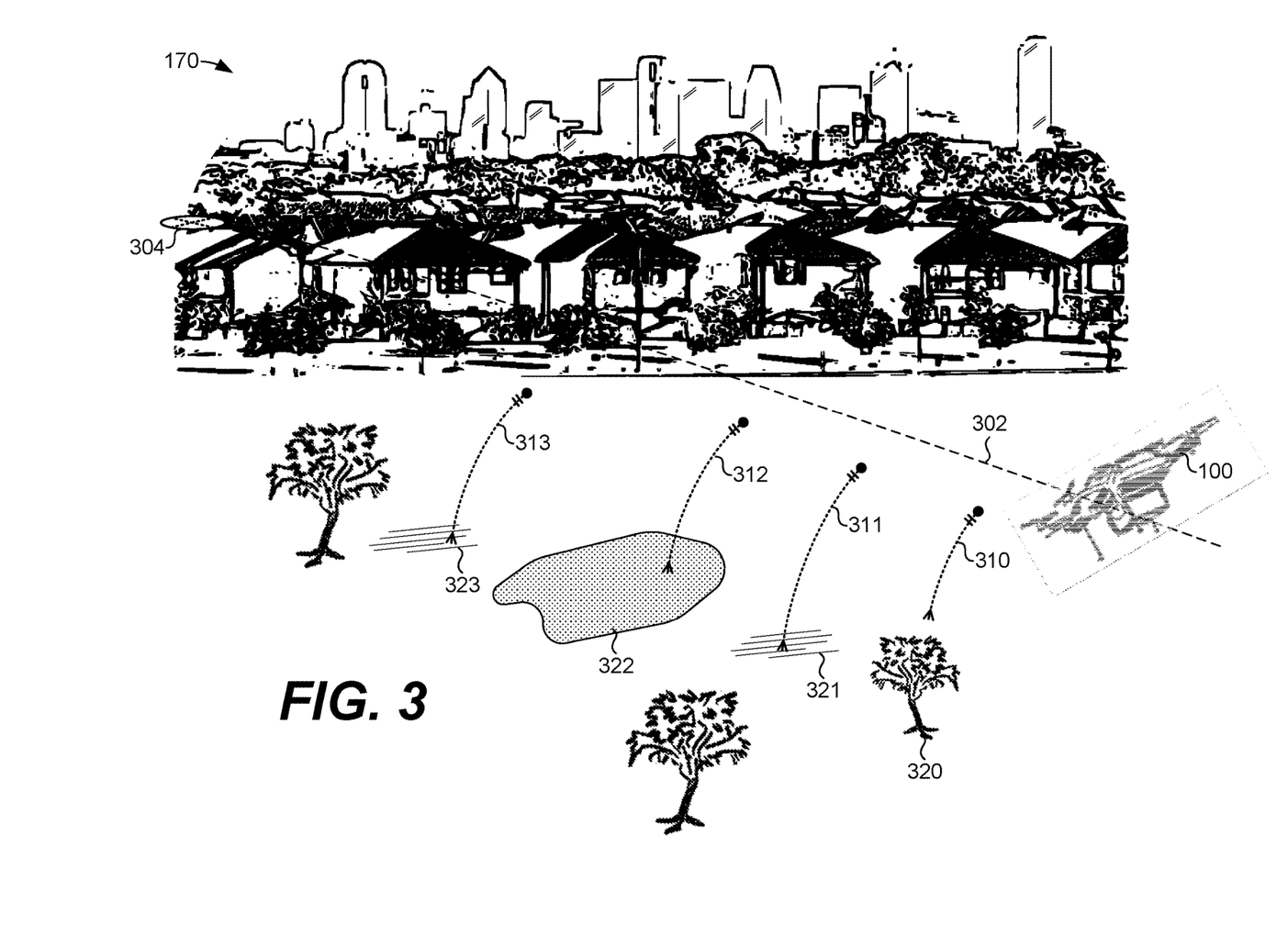
FIG. 3 further illustrates examples of directed fragmentation for the UAV in FIGS. 1 and 2 according to various embodiments of the present disclosure.

FIG. 3 further illustrates examples of directed fragmentation for the UAV 100 in FIGS. 1 and 2 according to various embodiments of the present disclosure. FIG. 3 is provided as a representative example, is not drawn to scale, and is not intended to be limiting as to the manner or sequence in which components can be dropped or fragmented away from the UAV 100. Similarly, the flight path 310 and the trajectories 311-313 are representative, not drawn to scale, and not intended to be limiting.

In FIG. 3, the UAV 100 is travelling along the flight path 302 to the delivery zone 304. As discussed above, the flight controller 220 directs the flight control operation of the UAV 100 along the flight path 302. At the same time, the fragmentation controller 250 evaluates the flight path 302 and the ongoing flight conditions of the UAV 100. As described above, the fragmentation controller 250 can evaluate the flight path 302 and the ongoing flight conditions of the UAV 100 based on feedback from the flight controller 220, the flight sensors 230, meteorological conditions, etc. Among other parameters, the flight path 302 can be defined by a height, speed, and direction of the UAV 100 over time. Additionally, the fragmentation controller 250 can calculate the momentum and potential energy of the UAV 100 along the flight path 302 over time.

Based on the flight path 302 and the ongoing flight conditions of the UAV 100, among other information, the fragmentation controller 250 evaluates or analyzes topography data associated with the region 170 and develops a fragmentation sequence for directed fragmentation of the UAV 100 in case of a disruption to its flight operation. The fragmentation sequence can include release timings and release locations for one or more components of the UAV 100.

In the example shown in FIG. 3, the fragmentation sequence includes a release timing and release location for a payload 280 of the UAV 100 to follow the trajectory 310. The fragmentation sequence also includes a release timing and release location for the UAV components 263, which can include a battery of the UAV 100, for example, to follow the trajectory 311. The fragmentation sequence further includes release timings and locations for the shell or housing 261 to follow the trajectory 312 and for the rotor system 260 to follow the trajectory 313.

The fragmentation sequence can be tailored to select suitable locations for descent of the payload 280, the components 263, the shell or housing 261, and the rotor system 260, among other components of the UAV 100, based on the topography of the region 170. As shown in the example of FIG. 2, the fragmentation controller 250 can determine a release timing and location for the payload 280 so that it descends along the trajectory 310 into the tree 320. At the same time, the fragmentation controller 250 can account for any change in the flight path 302 that is expected to occur due to the release of the payload 280. In turn, the fragmentation controller 250 can account for that change to the flight path 302 when determining release timings and locations for other components. Further, the fragmentation controller 250 can determine release parameters for the UAV components 263 to descend along the trajectory 311 onto the field or open area 321, for the shell or housing 261 to descend along the trajectory 312 into the pond 322, and for the rotor system 260 to descend along the trajectory 313 onto the field or open area 323.

The fragmentation controller 250 can calculate each of the trajectories 310-313 based on the height, speed, and direction of the UAV 100 at the release timing of each of the payload 280, the UAV components 263, the shell or housing 261, and the rotor system 260. The trajectories 310-313 can also be determined based on the weight, size, shape, and/or air drag coefficients of each of those respective components, for example, along with the current wind speed and other meteorological conditions, etc. The fragmentation controller 250 can also calculate the release timing and/or location for the trajectories 310-313 based on meteorological conditions, including wind, rain, hail, high or low pressure regions, and other meteorological conditions. In some cases, the fragmentation controller 250 can calculate certain flight parameters associated with releasing various components. For example, the fragmentation controller 250 can calculate a speed, pitch, yaw, or roll of the UAV 100 to achieve or approach one or more of the trajectories 310-313.

Each time the fragmentation controller 250 calculates a release timing, release location, and/or release parameters for one or more components, the fragmentation controller 250 can also calculate any changes that will occur to the flight path 302 of the UAV 100 and/or to release timings and locations for other components. For example, releasing the payload 280 can alter the momentum, flight speed, and/or direction of the UAV 100 and the direction of the flight path 302. Thus, the fragmentation controller 250 can calculate any changes in the flight path 302 of the UAV 100 as components are fragmented away. Thus, because changes in the flight path 302 of the UAV 100 are tracked over time as components are fragmented away, the release timings and release locations for later-fragmented components will thus be calculated, in part, based on earlier-fragmented component.

As noted above, the fragmentation sequence can be evaluated and updated over time as the UAV 100 proceeds along the flight path 302. The fragmentation sequence can then be executed, in part or in whole, depending upon the extent of any disruption to the flight operation of the UAV 100. In various circumstances, the fragmentation sequence can be executed upon partial or full breakdown of the flight operation of the UAV 100. A full breakdown or catastrophic failure of the flight operation of the UAV 100, such as one in which it enters into a free fall, is not the only case in which the fragmentation sequence may be executed, however. In other cases, the fragmentation sequence can be executed, in part or whole, if the flight operation of the UAV 100 is compromised in part, such as if one motor or engine of the rotor system 260 fails. In that case, the fragmentation controller 250 can partially control certain flight parameters of the UAV 100 when releasing various components. For example, the fragmentation controller 250 may be capable of controlling, at least in part, the pitch, yaw, or roll of the UAV 100 to achieve or approach one or more of the trajectories 310-313 for one or more components.

FIG. 3 and the trajectories 310-313 shown in FIG. 3 are provided by way of example and are not intended to be limiting. Further, the tree 320, open area 321, pond 322, and open area 323 are provided as examples of locations where the fragmentation controller 250 might choose to direct the placement of various components according to the concepts of directed fragmentation described herein. In other cases, the fragmentation controller 250 can identify and rank various locations over the geographic region 170 as candidate locations for dropping components. The fragmentation controller 250 can then assign certain components to be dropped to those locations based on various considerations, such as environmental, safety, timing, regulatory or legal, and/or other considerations. Additionally, the fragmentation controller 250 can assign components to be dropped to certain locations to save costs, avoid or reduce damage to payloads, UAV components, property, and to generally avoid or reduce any impact(s) over the geographic region 170.

Figure 4:
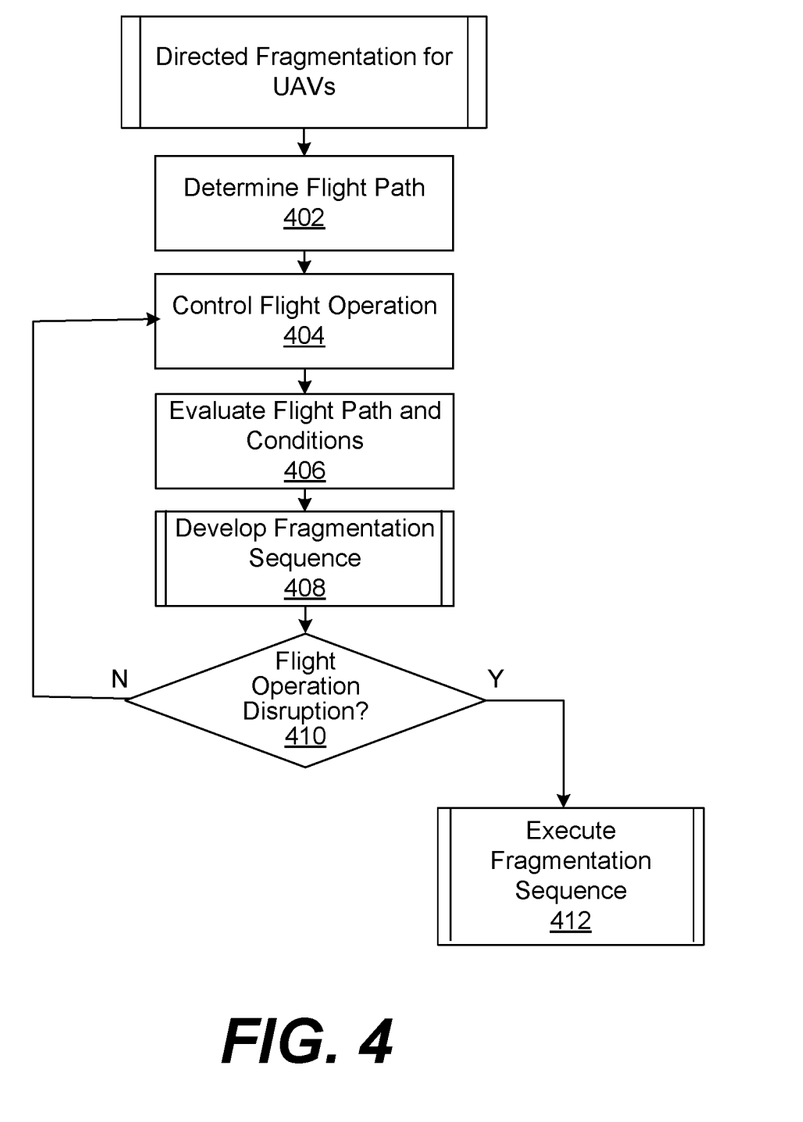
FIG. 4 illustrates a flow diagram of an example process of directed fragmentation of the UAV in FIGS. 1-3 according to various embodiments of the present disclosure.

FIG. 4 illustrates a flow diagram of an example process of directed fragmentation of the UAV 100 in FIGS. 1-3 according to various embodiments of the present disclosure. At reference numeral 402, the process includes the flight controller 220 determining a flight path of the UAV 100. The flight path can include a path from the airborne carrier 130 to a delivery zone, such as the delivery zone 172 in FIG. 1 or the delivery zone 304 in FIG. 3, for example, or to any other destination for the UAV 100. Data related to the destination locations can be stored as part of the delivery data 214, and the flight controller 220 can reference that information when determining the flight path. The flight path can include various flight parameters and/or characteristics, such as flight bearings, waypoints, speeds, heights, etc. The flight path, parameters, and characteristics can be stored in the flight control data store 210 as part of the flight control data 212.

At reference numeral 404, the process includes the flight controller 220 controlling the flight operation of the UAV 100 based on the flight path determined at reference numeral 402. The flight controller 220 can control the operation of the UAV using data gathered by the flight sensors 230 as described above.

At reference numeral 406, the process includes the flight path evaluator 252 of the fragmentation controller 250 evaluating the flight path and flight conditions of the UAV 100. Here, the flight path evaluator 252 can evaluate and analyze the flight path, parameters, and characteristics of the UAV 100 and monitor the ongoing operations of the flight operation of the UAV 100. The flight path evaluator 252 can evaluate and analyze this information, in part, to determine the fragmentation sequence at reference numeral 408 and to determine whether a disruption in flight operation of the UAV 100 has occurred at reference numeral 410. At reference numeral 406, the process can also include the flight path evaluator 252 evaluating or analyzing other flight conditions for the UAV 100, such as wind, rain, hail, high or low pressure regions, and other meteorological conditions that may impact the timing, location, and other parameters for fragmenting away components.

At reference numeral 408, the process includes the fragmentation sequence engine 254 developing a fragmentation sequence for the UAV 100. The fragmentation sequence can include one or more release locations, release timings, and release flight parameters that define a plan for directed fragmentation of the UAV 100. The development of the fragmentation sequence is described in further detail below with reference to FIG. 5.

At reference numeral 410, the process includes the fragmentation controller 250 determining whether a disruption to the flight operation of the UAV 100 has occurred. In various cases, a disruption in flight operation can range from an unexpected weather or meteorological condition, an unexpected deviation from the expected flight path, a partial loss in flight control, a catastrophic failure of flight operation, or any other disruption to the flight operation of the UAV 100. If a disruption has occurred, the process proceeds to execution of the fragmentation sequence at reference numeral 412, which is detailed in FIG. 6. If a disruption has not occurred, then the process proceeds back to reference numeral 404 for continued control and evaluation of the flight path and flight operation of the UAV and continued development, evaluation, and revision of the fragmentation sequence. In other cases, the process can include other determinations at reference numeral 410 related to whether to execute the fragmentation sequence. For example, the process can decide to execute the fragmentation sequence for reasons other than flight disruptions, such as based on control instructions from the airborne carrier 130 or other reasons.

Figure 5:
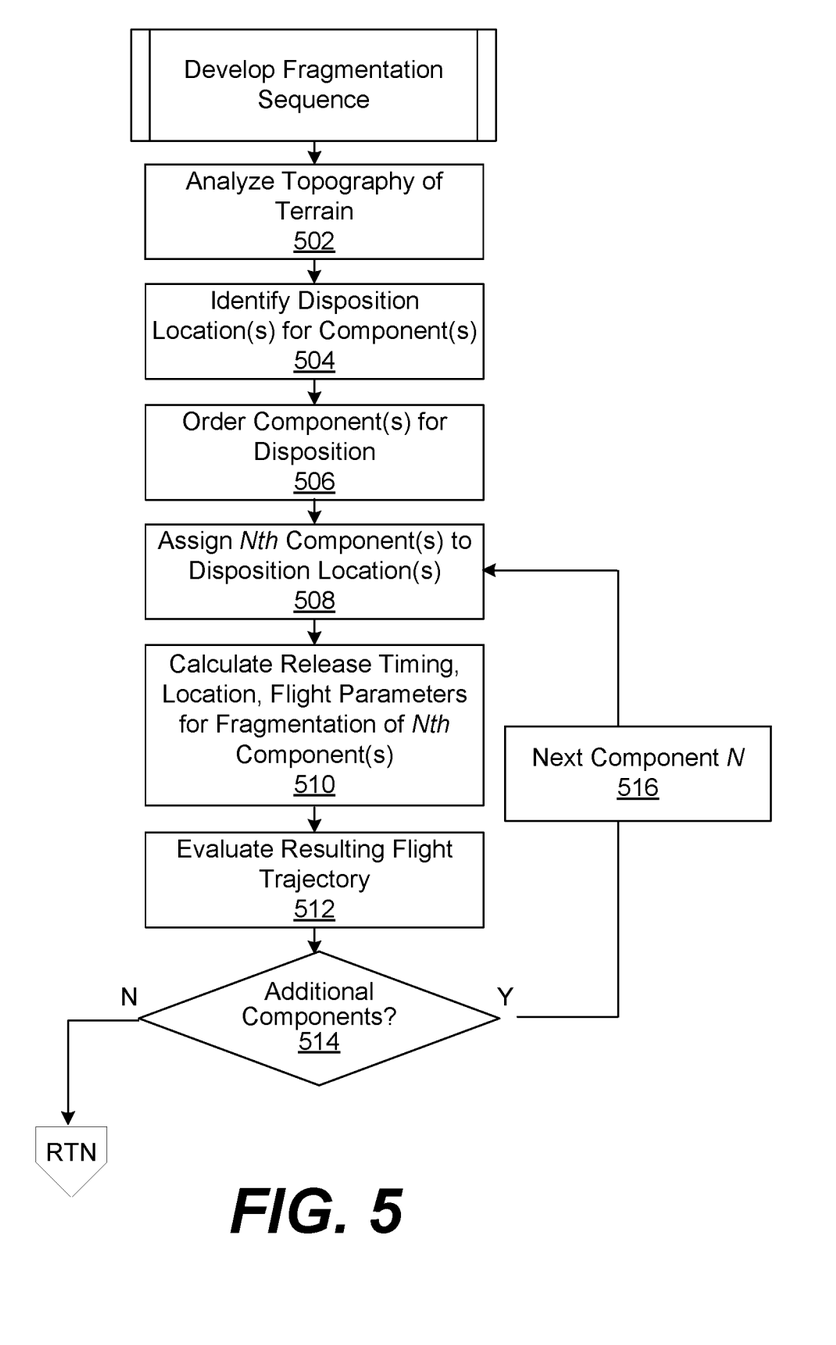
FIG. 5 illustrates a flow diagram of an example process for the development of a fragmentation sequence for the UAV in FIGS. 1-3 according to various embodiments of the present disclosure.

Turning to FIG. 5, a flow diagram of an example process for the development of a fragmentation sequence is shown. At reference numeral 502, the process includes the fragmentation sequence engine 254 analyzing the topography of the terrain along the flight path determined at reference numeral 402 in FIG. 4. As described above, the terrain topography information can be stored in the terrain topology data 216 and can include information about what artificial and natural features exist along the flight path. For example, the terrain topology data 216 can identify the locations and boundaries of bodies of water, rivers, fields, forested areas, hills, mountains, and other topography data. Additionally, the terrain topology data 216 can identify the locations and boundaries of residential, commercial, and industrial buildings and developments, highways and surface streets, parking lots, stadiums, schools, recreational areas, and other artificial features. At reference numeral 502, the process can also include the fragmentation sequence engine 254 analyzing other flight conditions, such as wind, rain, hail, high or low pressure regions, and other meteorological conditions that may impact the timing, location, and other parameters for fragmenting away components. In some cases, the fragmentation sequence engine 254 can also analyze other flight conditions, such as whether birds, trees, power lines, or other obstructions present potential obstructions.

At reference numeral 504, the process includes the fragmentation sequence engine 254 identifying one or more disposition locations for one or more components of the UAV 100. Similar to the examples described above with reference to FIGS. 1-3, the disposition locations can be considered candidate locations for dropping components of the UAV 100 in the case of disruptions to flight operations. The fragmentation sequence engine 254 can reference the terrain topology data 216 for this task. For example, the fragmentation sequence engine 254 can review the terrain topology data 216 to identify locations that are free (or relatively free) from certain artificial structures. The terrain topology data 216 can also include metrics or priority values for ranking the preference of certain locations over others as described above. For example, the terrain topology data 216 can associate a body of water or field with a higher ranking for the disposition of components than a residential area.

At reference numeral 506, the process includes the fragmentation sequence engine 254 ordering or prioritizing components of the UAV 100 for fragmentation. As one example, the fragmentation sequence engine 254 may prioritize the payload 280 for dropping before the rotor system 260 because the payload 280 is not necessary for continued flight operations. Alternatively, the landing gear 262 can be prioritized over the payload 280 if the landing gear weighs more than the payload 280. The fragmentation sequence engine 254 can select the order based on various factors, such as the replacement value or cost of the components, the air drag coefficients of the components, the weight of the components, the purpose of the components, and other factors.

At reference numeral 508, the process includes the fragmentation sequence engine 254 assigning each (e.g., Nth) component to one of the disposition locations identified at reference numeral 504. The assignment can be determined based on a preference to drop certain components to certain locations in a preferred order, for example, to save costs, avoid or reduce damage to payloads, UAV components, property, etc.

At reference numeral 510, the process includes the fragmentation sequence engine 254 calculating (or estimating) a release timing, release location, and any release flight parameters for fragmentation of the components assigned to disposition locations at reference numeral 508. Because the UAV 100 can be expected to be moving at a certain rate of speed, in a certain direction, and at certain height upon any disruption in flight operation, the release timing can be determined with reference to or in association with the release location. The release location can be determined based on a relative or absolute coordinate system, with reference to map or topology data stored in the flight control data store 210, based on GPS coordinates, based on information from the sensors 230, and/or other related information. The release timings and locations can be calculated or estimated to direct components along certain descent trajectories similar to the examples described herein.

Additionally, the fragmentation sequence engine 254 can calculate any flight parameters related to the release timings and locations. For example, in the case of a partial loss in flight operation of the UAV 100, the UAV 100 may be capable of orienting itself, at least to some extent, before fragmenting away components. In that context, the flight parameters can include a desired fragmentation height, speed, pitch, yaw, or roll of the UAV 100, and the fragmentation controller 250 can attempt to control the flight operations of the UAV 100 to achieve those conditions before releasing components. In addition to the expected height, speed, and direction of the UAV 100, the fragmentation sequence engine 254 can calculate the release timing, location, and flight parameters based on current meteorological conditions, including wind, rain, hail, high or low pressure regions, and other meteorological conditions.

At reference numeral 512, the process includes the flight path evaluator 252 evaluating the resulting flight trajectory of the UAV 100, assuming that one or more components of the UAV 100 are fragmented away. During any fragmentation sequence, releasing components of the UAV 100 will necessarily alter the weight, speed, air drag coefficient, and other flight path and flight orientation factors for the UAV 100. In that context, the flight path evaluator 252 evaluates how the flight path of the UAV 100 might change as individual components are fragmented away. This information can be applied to the analysis for dropping other components and a determination as to whether any additional components should or should not be fractured away. At the same time, the flight path evaluator 252 can evaluate and update release conditions for other components based on the changes in the flight path of the UAV 100. That is, the flight path evaluator 252 can evaluate the release timings, locations, and flight parameters associated with other, later-fragmented components based on the manner in which the flight path of the UAV 100 changes as individual components are fragmented away. To the extent necessary, the flight path evaluator 252 can update the release conditions for other components, including the release timings, locations, and flight parameters associated with those later-fragmented components.

At reference numeral 514, the process includes determining whether any additional components of the UAV 100 are being considered for directed fragmentation. If not, then the process proceeds back to FIG. 4. Otherwise, if more components are being considered, then the process proceeds to reference numeral 516 to identify the next component and to reference numeral 508 for the assignment of that component to a location for disposition.

Figure 6:
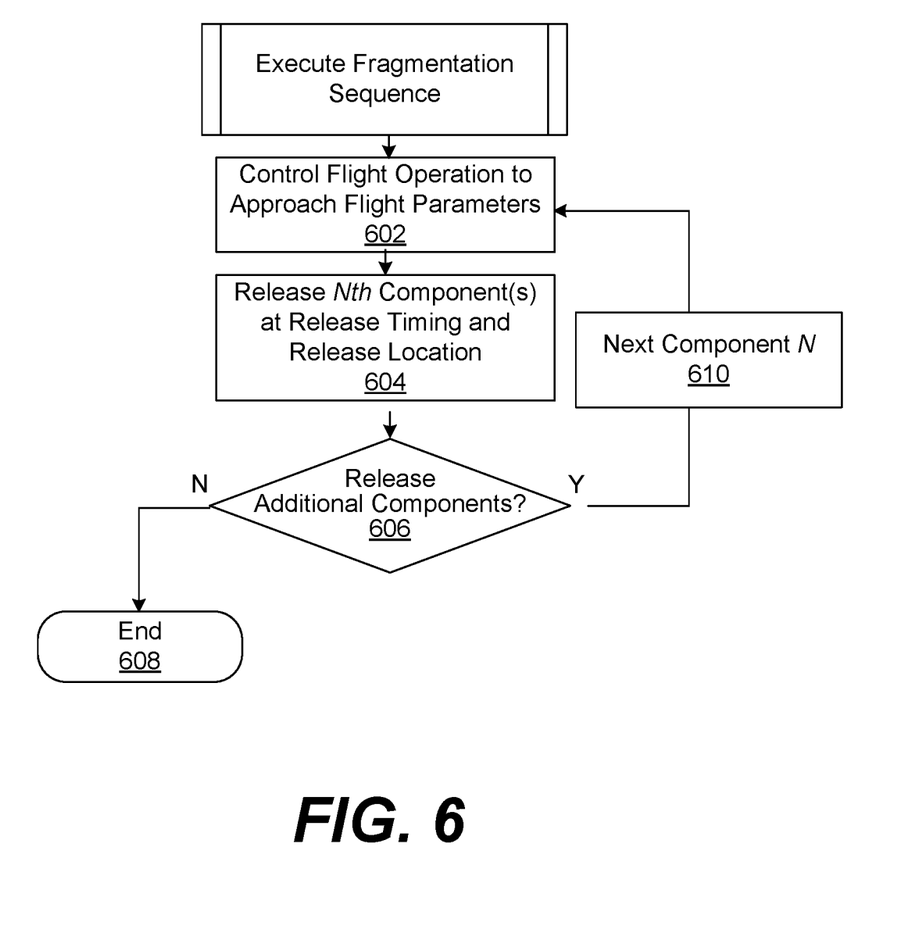
FIG. 6 illustrates a flow diagram of an example process of fragmentation sequence execution for the UAV in FIGS. 1-3 according to various embodiments of the present disclosure.

FIG. 6 illustrates a flow diagram of an example process for the execution of a fragmentation sequence by the UAV 100 in FIGS. 1-3. The execution of the fragmentation sequence begins upon the detection of some disruption to the flight operation of the UAV 100, as shown in reference numeral 412 in FIG. 4. As discussed above, the fragmentation controller 250 can take over or override flight control of the UAV 100 upon the detection of some disruption to the flight operation of the UAV 100.

At reference numeral 602 in FIG. 6, the process includes the fragmentation controller 250 controlling the flight operation of the UAV 100 to approach certain flight parameters for releasing the Nth component (or components) of the UAV 100. For example, in the case of a partial loss in flight operation of the UAV 100, the UAV 100 may be capable of orienting itself, at least to some extent, before fragmenting away components. In that context, the fragmentation controller 250 can control the flight operation of the UAV 100 at reference numeral 602 to approach a desired fragmentation height, speed, pitch, yaw, or roll of the UAV 100, for example, before releasing components.

At reference numeral 604, the process includes the fragmentation sequence engine releasing the Nth component (or components) of the UAV 100 at the release timing and release location determined at reference numeral 510. Here, the fragmentation controller 250 can actuate, activate, or control one or more of the associated release mechanisms 271-274 to release the Nth component. The release mechanisms 271-274 can be embodied as various mechanisms actuated by the fragmentation controller 250 to release components of the UAV 100 as described herein.

At reference numeral 606, the process includes the fragmentation sequence engine 250 determining whether or not additional components of the UAV 100 are scheduled for release according to the fragmentation sequence. If not, then the process proceeds ends. Otherwise, if more components are scheduled for release at another timing and/or location, then the process proceeds to reference numeral 610 to identify the next component and to reference numeral 602 to further control the flight operations of the UAV 100, if possible, before releasing the next component.

It should be appreciated that the process flows shown in FIGS. 4-6 can vary as compared to that shown. For example, after releasing any given component at reference numeral 604, the process can conduct a further evaluation of the resulting flight path or trajectory of the UAV 100 to determine whether it is necessary or beneficial to fragment away additional components. As another example, in the case of a catastrophic failure of the flight operation of the UAV 100, the operations at reference numeral 602 can be omitted entirely, because it may not be possible to adjust the flight operation of the UAV 100 before dropping components. Additionally, both flight operations by the flight controller 220 and directed fragmentation operations by the fragmentation controller 250 can overlap in execution in certain cases, and the sequence of events can vary from that shown in FIGS. 4-6.

Figure 7:
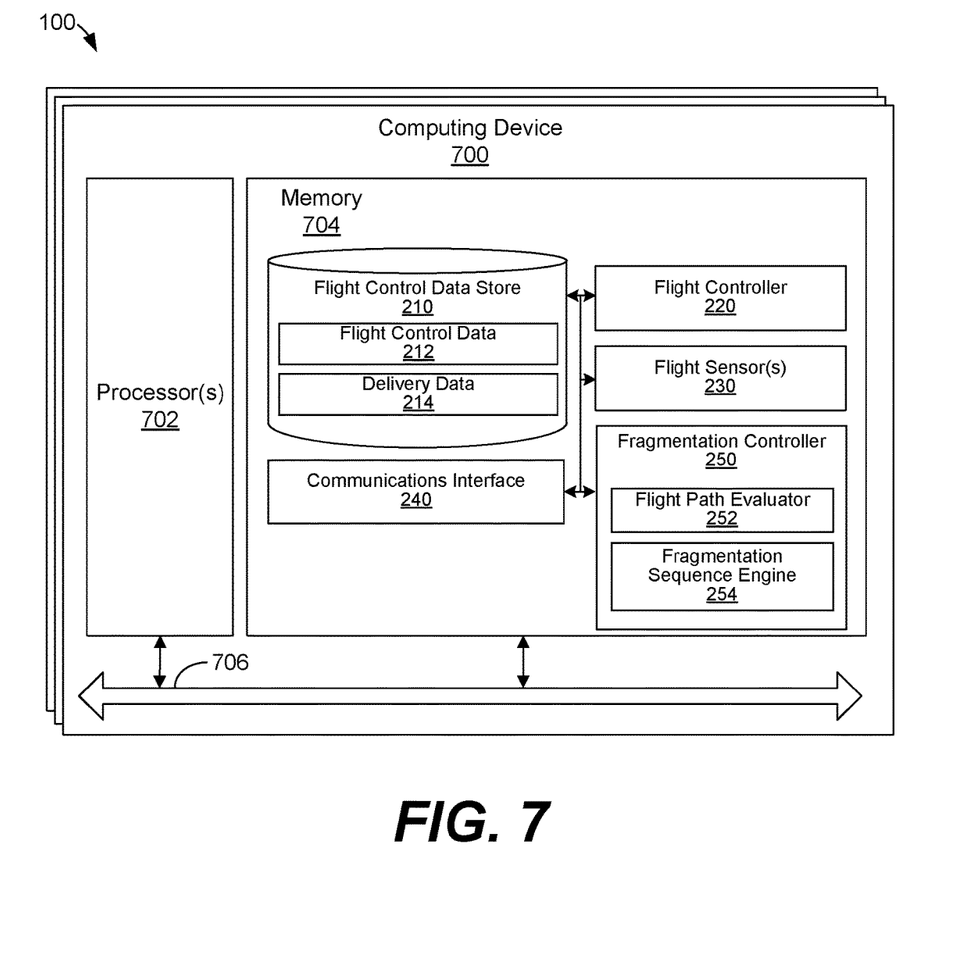
FIG. 7 illustrates an example schematic block diagram of the computing device employed in the UAV in FIGS. 1-3 according to various embodiments of the present disclosure.

FIG. 7 illustrates an example schematic block diagram of the computing device 200 employed in the UAV 100 in FIGS. 1-3 according to various embodiments of the present disclosure. The computing device 200 includes one or more computing devices 700. Each computing device 700 includes at least one processing circuit or system, for example, having at least one processor 702 and memory 704, both of which are electrically and communicatively coupled to a local interface 706. The local interface 706 can be embodied as, for example, at least one data bus with an accompanying address/control bus or other interface structure.

In various embodiments, the memory 704 can store data and software or executable-code components for evaluation and execution by the processor 702. For example, the memory 704 can store executable-code components associated with the flight controller 220 and/or the fragmentation controller 250, for execution by the processor 702. The memory 704 can also store data such as that stored in the flight control data store 210, among other data.

The memory 704 can store other executable-code components for execution by the processor 702. For example, an operating system can be stored in the memory 704 for execution by the processor 502. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As described above, the memory 704 stores software for execution by the processor 702. In this respect, the terms "executable" or "for execution" refer to software forms that can ultimately be run or executed by the processor 702, whether in source, object, machine, or other form. Examples of executable programs include, for example, a compiled program that can be translated into a machine code format and loaded into a random access portion of the memory 704 and executed by the processor 702, source code that can be expressed in an object code format and loaded into a random access portion of the memory 704 and executed by the processor 702, source code that can be interpreted by another executable program to generate instructions in a random access portion of the memory 704 and executed by the processor 702, etc. An executable program can be stored in any portion or component of the memory 704 including, for example, a random access memory (RAM), read-only memory (ROM), magnetic or other hard disk drive, solid-state, semiconductor, or similar drive, universal serial bus (USB) flash drive, memory card, other memory structures or components, or combinations thereof.

In various embodiments, the memory 704 can include both volatile and nonvolatile memory and data storage components. Volatile components are those that do not retain data values upon loss of power. Nonvolatile components are those that retain data upon a loss of power. Thus, the memory 704 can include, for example, a RAM, ROM, magnetic or other hard disk drive, solid-state, semiconductor, or similar drive, USB flash drive, memory card, other memory structures or components, or combinations thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

Also, the processor 702 can represent multiple processors 702 and/or multiple processor cores and the memory 704 can represent multiple memories that operate in parallel, respectively, or in combination. Thus, the local interface 706 can be an appropriate network or bus that facilitates communication between any two of the multiple processors 702, between any processor 702 and any of the memories 704, or between any two of the memories 704, etc.

As discussed above, the flight controller 220 and the fragmentation controller 250 can be embodied, in part, by software or executable-code components for execution by general purpose hardware. Alternatively, the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or processes in FIGS. 4-6 are representative of certain processes, functionality, and operations of embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 702. The machine code can be converted from the source code, etc. Further, each block can represent, or be connected with, a circuit or a number of interconnected circuits to implement a certain logical function or process step.

Although the flowchart or process diagrams in FIGS. 4-6 illustrate a specific order, it is understood that the order can differ from that which is depicted. For example, an order of execution of two or more blocks can be scrambled relative to the order shown. Also, two or more blocks shown in succession in FIGS. 4-6 can be executed concurrently or with partial concurrence. Further, in some embodiments, one or more of the blocks shown in FIGS. 4-6 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application component described herein, such as the flight controller 220 and the fragmentation controller 250 that is embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIGS. 4-6. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. Examples of such computer-readable media include, but are not limited to, magnetic hard drives, memory cards, solid-state drives, or other memory devices described herein or their known equivalents. Also, the computer-readable medium can include a RAM including, for example, an SRAM, DRAM, or MRAM. In addition, the computer-readable medium can include a ROM, a PROM, an EPROM, an EEPROM, or other similar memory device.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

The invention claimed is:

1. An unmanned aerial vehicle (UAV), comprising:
   a plurality of components of the UAV; and
   a controller configured to:
      control a flight operation of the UAV;
      evaluate a flight path of the UAV and flight conditions for the UAV;
      develop a release timing and a release location for a component among the plurality of components of the UAV based on the flight path and the flight conditions;
      detect a disruption in the flight operation of the UAV; and
      direct fragmentation of the component apart from the UAV at the release timing and at the release location in response to the disruption in the flight operation of the UAV.

2. The UAV according to claim 1, wherein to develop the release timing and the release location, the controller is further configured to:

analyze topography of terrain along the flight path to identify a plurality of disposition locations on the terrain; and calculate the release timing and the release location for a release trajectory of the component to a disposition location among the plurality of disposition locations.

3. The UAV according to claim 1, wherein the controller is further configured to calculate flight parameters for fragmentation of the component apart from the UAV, the flight parameters including at least one of a height, speed, pitch, yaw, or roll of the UAV.

4. The UAV according to claim 3, wherein the controller is further configured to control the flight operation of the UAV to approach the flight parameters for fragmentation of the component apart from the UAV at the release timing and at the release location.

5. A method to operate an unmanned aerial vehicle (UAV), comprising:

evaluating, by one or more computing devices of the UAV, a flight path of the UAV;

developing, by the one or more computing devices of the UAV, a release timing and a release location for a component of the UAV based on the flight path; and directing, by the one or more computing devices of the UAV, fragmentation of the component apart from the UAV according to the release timing and the release location in response to a disruption of a flight operation of the UAV.

6. The method according to claim 5, wherein developing the release timing and the release location comprises:

analyzing, by the one or more computing devices of the UAV, topography of terrain along the flight path; and identifying, by the one or more computing devices of the UAV, a plurality of disposition locations on the terrain for directed disposition of the component of the UAV.

7. The method according to claim 6, wherein developing the release timing and the release location comprises:

assigning, by the one or more computing devices of the UAV, the component of the UAV to a disposition location among the plurality of disposition locations; and calculating, by the one or more computing devices of the UAV, the release timing and the release location for a release trajectory of the component of the UAV to the disposition location.

8. The method according to claim 7, further comprising evaluating, by the one or more computing devices of the UAV, a resulting flight trajectory of the UAV after the fragmentation of the component apart from the UAV.

9. The method according to claim 8, further comprising calculating, by the one or more computing devices of the UAV, another release timing and another release location for another component of the UAV based on the resulting flight trajectory of the UAV.

10. The method according to claim 5, further comprising calculating, by the one or more computing devices of the UAV, flight parameters for the fragmentation of the component apart from the UAV.

11. The method according to claim 5, wherein:
the UAV includes a plurality of components; and
the method further comprises developing, by the one or more computing devices of the UAV, a fragmentation sequence for fragmentation of the plurality of components apart from the UAV.

12. The method according to claim 11, wherein developing the fragmentation sequence comprises:

identifying, by the one or more computing devices of the UAV, a plurality of disposition locations for directed disposition of the plurality of components of the UAV; and assigning, by the one or more computing devices of the UAV, the plurality of components of the UAV to individual ones of the plurality of disposition locations.

13. An unmanned aerial vehicle (UAV), comprising:
a controller configured to:
control a flight operation of the UAV;
develop a release timing for a component of the UAV based on a flight path of the UAV; and
direct fragmentation of the component apart from the UAV according to the release timing in response to a disruption in a flight operation of the UAV.

14. The UAV according to claim 13, wherein the controller is further configured to identify a release location for the component of the UAV based on the flight path of the UAV.

15. The UAV according to claim 14, wherein, to identify the release location and the release timing, the controller is further configured to:

evaluate a flight path of the UAV; and
identify at least one disposition location for directed disposition of the component of the UAV based on the flight path.

16. The UAV according to claim 15, wherein the controller is further configured to:

evaluate a resulting flight trajectory of the UAV after the fragmentation of the component apart from the UAV; and develop another release timing and another release location for a release trajectory of another component of the UAV based on the resulting flight trajectory of the UAV.

17. The UAV according to claim 13, wherein:
the UAV includes a plurality of components; and
the controller is further configured to develop a fragmentation sequence for fragmentation of the plurality of components apart from the UAV.

18. The UAV according to claim 17, wherein, to develop the fragmentation sequence, the controller is further configured to:

identify a plurality of disposition locations on terrain for directed disposition of the plurality of components of the UAV; and assign one or more of the plurality of components of the UAV to individual ones of the plurality of disposition locations.

19. The UAV according to claim 13, wherein the controller is further configured to calculate flight parameters for the fragmentation of the component apart from the UAV, the flight parameters including at least one of a height, speed, pitch, yaw, or roll of the UAV.

20. The UAV according to claim 19, wherein the controller is further configured to control the flight operation of the UAV to approach the flight parameters for fragmentation of the component apart from the UAV.

* * * * *